ed to be swung into and out of operative positions. The free end of the locking member or block 7 is forked, and the fork-arms 10 are adapted to pass astride the locking lug 6 on the adjacent portion of the nut; and in said arms 10 are formed alined key receiving holes 11 which, when the locking member 7 is in a closed or operative position, are adapted to register with a hole 12 formed in the locking lug 6. When the locking member is thus brought in operative position, a key 13 is inserted through the alined holes 11 and 12, thereby securely fastening the locking member in operative position. The key 13 is formed of malleable metal and when driven through the holes the inner end of the key is engaged with the angular surface of a clenching recess 14, whereby said end of the key is turned or upset and the key thus prevented from being casually disengaged from the holes and thus releasing the locking member. By forming the key 13 of malleable metal, the clenched end of the same may be straightened and the key withdrawn by the application of a suitable instrument, thus permitting the locking member to be released when desired.

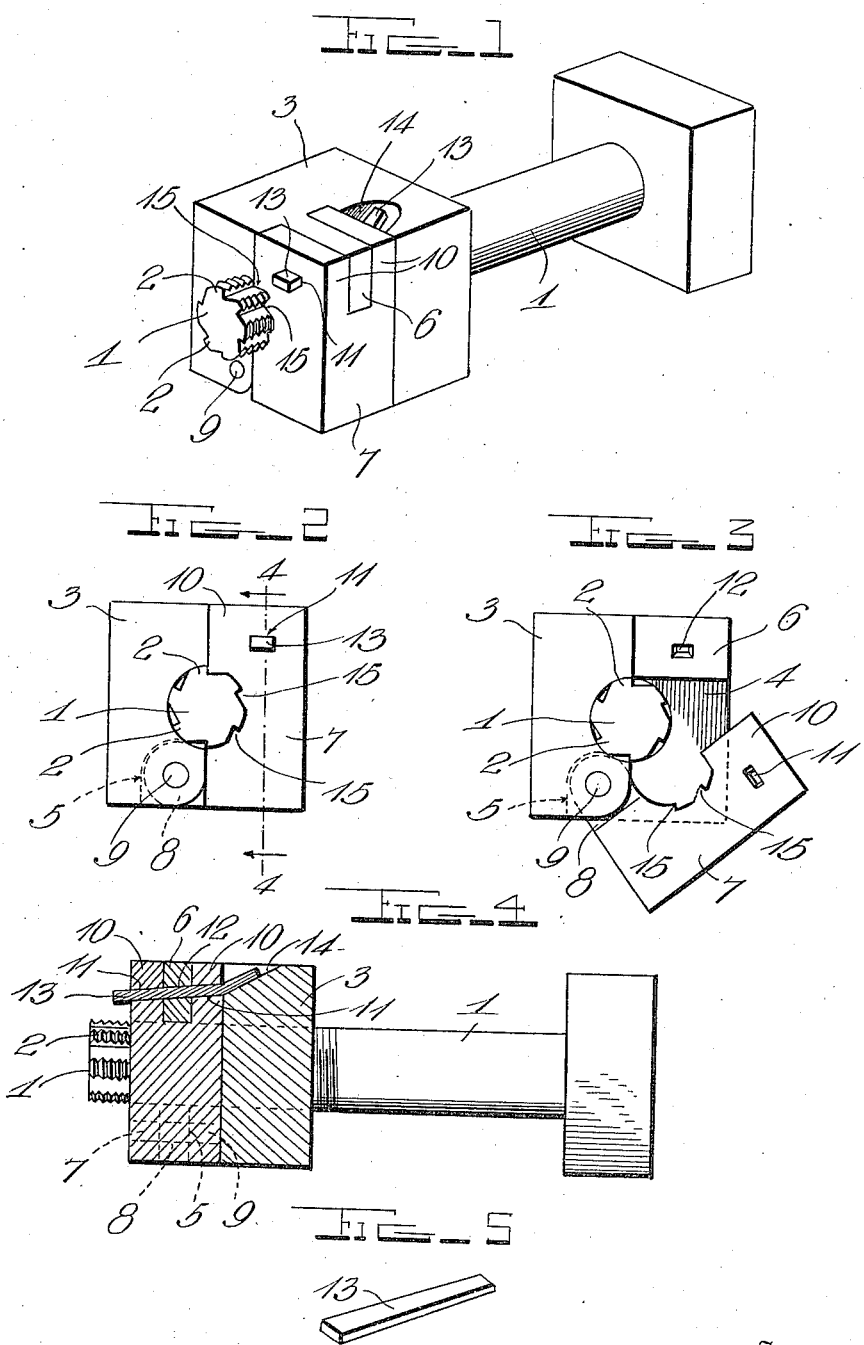

UNITED STATES PATENT OFFICE.

CHRISTOPHER G. JONES, OF COWEN, WEST VIRGINIA.

NUT-LOCK.

1,060,094.　　　　Specification of Letters Patent.　　　Patented Apr. 29, 1913.

Application filed May 22, 1911. Serial No. 628,751.

*To all whom it may concern:*

Be it known that I, CHRISTOPHER G. JONES, a citizen of the United States, residing at Cowen, in the county of Webster and State of West Virginia, have invented certain new and useful Improvements in Nut-Locks; and I do declare the following to be a full, clear, and exact description of the invention, such as will enable others skilled in the art to which it appertains to make and use the same.

This invention relates to improvements in nut locks.

One object of the invention is to provide a nut and bolt having a simple and improved locking mechanism, whereby the nut may be securely fastened in its adjusted position on the bolt, said mechanism being readily released to permit the nut to be removed when desired.

With this and other objects in view, the invention consists of certain novel features of construction, combination and arrangement of parts as will be more fully described and particularly pointed out in the appended claim.

In the accompanying drawings: Figure 1 is a perspective view of a bolt and nut showing my improved locking mechanism applied thereto and the parts in locked position; Fig. 2 is an end view of the same; Fig. 3 is a similar view showing the locking member of the nut in open position; Fig. 4 is a longitudinal sectional view through the nut and the fastening mechanism for the locking member taken on the line 4—4 of Fig. 2; Fig. 5 is a detail view of the key for fastening the locking member in operative position.

Referring more particularly to the drawings, 1 denotes the bolt in the outer portion of the threaded end of which is formed a series of grooves producing longitudinally disposed ratchet shaped teeth 2, the purpose of which will be hereinafter described.

Adapted to be screwed onto the bolt is a nut 3. One side of the outer end of the nut is cut away from the outer side to the center of the nut to form a right angular recess 4. In the remaining side of the nut and at one side of the bolt hole is formed a bearing notch 5. On the opposite side of the bolt hole from the notch 5 is formed a right angularly projecting locking lug 6.

Adapted to be engaged with the recess 4 is a locking member 7 comprising a block having on its inner side adjacent to one edge a hinge lug 8 which fits into the notch 5 and is hingedly secured therein by a pivot pin 9, whereby the locking member is adapted to be swung into and out of operative positions. The free end of the locking member or block 7 is forked, and the fork-arms 10 are adapted to pass astride the locking lug 6 on the adjacent portion of the nut; and in said arms 10 are formed alined key receiving holes 11 which, when the locking member 7 is in a closed or operative position, are adapted to register with a hole 12 formed in the locking lug 6. When the locking member is thus brought in operative position, a key 13 is inserted through the alined holes 11 and 12, thereby securely fastening the locking member in operative position. The key 13 is formed of malleable metal and when driven through the holes the inner end of the key is engaged with the angular surface of a clenching recess 14, whereby said end of the key is turned or upset and the key thus prevented from being casually disengaged from the holes and thus releasing the locking member. By forming the key 13 of malleable metal, the clenched end of the same may be straightened and the key withdrawn by the application of a suitable instrument, thus permitting the locking member to be released when desired.

In the unthreaded bolt-opening of the locking member or block 7 is formed a series of longitudinally disposed ratchet shaped ribs or teeth 15, which when the locking member is in a closed or operative position are adapted to engage longitudinally disposed ratchet shaped locking teeth or ribs 2 formed in the adjacent portion of the bolt as shown. By thus bringing the toothed surface of the nut into engagement with the toothed portion of the bolt, and fastening the locking member in operative position, in will be seen that the nut is positively secured against being unscrewed or casually removed from the bolt.

From the foregoing description, taken in connection with the accompanying drawings, the construction and operation of the invention will be readily understood without requiring a more extended explanation.

Having thus described my invention, what I claim is:

In combination with a combined screw threaded bolt having longitudinal grooves forming ratchet teeth, of a nut composed of two parts, the body portion of which is provided with internal screw threads for engagement with the threads upon the bolt, one side of the outer end of the nut being cut away and having a centrally positioned projecting locking lug forming a continuation of one side of the nut, a locking member adapted to completely fill the cutaway portion in the nut, the body portion of the latter having an angular exposed cavity formed therein, said locking member having a lug received by a corresponding recess in the nut and pivoted therein, the free end of the locking member being forked for receiving the locking lug, and also provided with teeth for interlocking engagement with the ratchet teeth on the bolt, and a key adapted to be forced through the alining openings in the forked end of the locking member and the lug projecting from the nut and deflected by the angular exposed cavity formed in the nut, to lock the nut in an adjusted position upon the bolt.

In testimony whereof I have hereunto set my hand in presence of two subscribing witnesses.

CHRISTOPHER G. JONES.

Witnesses:
L. A. LYNCH,
W. F. HOLLISTER.

Copies of this patent may be obtained for five cents each, by addressing the "Commissioner of Patents, Washington, D. C."